US010550266B2

(12) United States Patent
Hu et al.

(10) Patent No.: US 10,550,266 B2
(45) Date of Patent: Feb. 4, 2020

(54) TWO-WAY SHAPE MEMORY POLYMER COMPOSITE MATERIAL AND PREPARATION METHOD THEREOF

(71) Applicant: POLYU BASE (SHENZHEN) LIMITED, Shenzhen (CN)

(72) Inventors: Jinlian Hu, Kowloon (HK); You Wu, Kowloon (HK)

(73) Assignee: POLYU BASE (SHENZHEN) LIMITED, Shenzhen (CN)

( * ) Notice: Subject to any disclaimer, the term of this patent is extended or adjusted under 35 U.S.C. 154(b) by 933 days.

(21) Appl. No.: 14/453,687

(22) Filed: Aug. 7, 2014

(65) Prior Publication Data

US 2015/0344690 A1    Dec. 3, 2015

(30) Foreign Application Priority Data

May 29, 2014 (CN) .......................... 2014 1 0234045

(51) Int. Cl.
*C08L 83/04* (2006.01)
*C08L 9/06* (2006.01)
(Continued)

(52) U.S. Cl.
CPC ............ *C08L 83/04* (2013.01); *B29C 55/005* (2013.01); *C08L 9/00* (2013.01); *C08L 9/06* (2013.01);
(Continued)

(58) Field of Classification Search
CPC .. C08L 83/04; C08L 9/00; C08L 23/20; C08L 9/06; C08L 23/06; C08L 21/00;
(Continued)

(56) References Cited

U.S. PATENT DOCUMENTS

2011/0217547 A1*   9/2011   Mather ................. B29C 61/003
                                                 428/339
2012/0253451 A1*  10/2012   Sahatjian ................. A61F 2/88
                                                 623/1.15

FOREIGN PATENT DOCUMENTS

CN          1706998 A       12/2005
CN        101164770 A        4/2008
WO         1999/42528        8/1999

OTHER PUBLICATIONS

Marc Behl , etal.; Reversible Bidirectional Shape-Memory Polymers; wileyonlinelibrary.com; Adv. Mater. 2013, 25, 4466-4469.
(Continued)

*Primary Examiner* — Robert J Grun
(74) *Attorney, Agent, or Firm* — Ladas & Parry LLP

(57) ABSTRACT

A two-way shape memory polymer composite material is provided, which comprises two interpenetrating network polymers, wherein one polymer is a shape memory polymer made of crystalline cross-linked polymer, the other one is a cross-linked elastomeric material. The composite material is formed by interpenetration of two network polymers, wherein one network polymer will shrink under heating and the other network polymer acts as the segment for energy storage. When the first polymer network shrinks under heating, it presses the second polymer network, while the heating is cancelled the pressed second polymer network will enforce the first polymer network to recover the original shape, therefore it has the behavior of two-way shape memory.

11 Claims, 1 Drawing Sheet

(51) Int. Cl.
  B29C 55/00 (2006.01)
  C08L 45/00 (2006.01)
  C08L 23/20 (2006.01)
  C08L 23/06 (2006.01)
  C08L 21/00 (2006.01)
  C08L 9/00 (2006.01)
  B29K 9/00 (2006.01)
  B29K 9/06 (2006.01)
  B29K 21/00 (2006.01)
  B29K 23/00 (2006.01)
  B29K 75/00 (2006.01)
  B29K 83/00 (2006.01)
  B29L 31/00 (2006.01)

(52) U.S. Cl.
  CPC ............... *C08L 21/00* (2013.01); *C08L 23/06* (2013.01); *C08L 23/20* (2013.01); *C08L 45/00* (2013.01); *B29K 2009/00* (2013.01); *B29K 2009/06* (2013.01); *B29K 2021/00* (2013.01); *B29K 2023/06* (2013.01); *B29K 2023/18* (2013.01); *B29K 2023/38* (2013.01); *B29K 2075/00* (2013.01); *B29K 2083/00* (2013.01); *B29L 2031/731* (2013.01); *B29L 2031/755* (2013.01); *B29L 2031/7722* (2013.01)

(58) Field of Classification Search
  CPC .................. C08L 45/00; B29C 55/005; B29K 2995/0041; B29K 2221/006; B29K 2105/0091; B29K 2105/246; B29K 2023/06; B29K 2075/00; B29K 2009/00; B29K 2083/00; B29K 2009/06; B29L 2031/755; B29L 2031/7722; B29L 2031/731
  See application file for complete search history.

(56) References Cited

OTHER PUBLICATIONS

Jan Van Humbeeck; Shape Memory Alloys: A Material and a Technology; Advanced Engineering Material 2011, 3, No. 11, 1438-1656.
Kristofer K Westbrook et al.; Two-Way Reversible Shape Memory Effects in a Free-Standing Polymer Composite; Smart Mater. Struct. 20 (2011) 065010 (9pp).
Taekwoong Chung, et al.; Two-Way Reversible Shape Memory in a Semicrystalline Network; Macromolecules 2008, 41, 184-192.
Shaojun Chen, et al.; Two-Way Shape Memory Effect in Polymer Laminates; Materials Letters 62 (2008) 4088-4090; journal homepage; www.elsevier.com/ locate/mailel.
English Abstract of CN1706998 A.
English Abstract of CN101164770 A.

* cited by examiner

TWO-WAY SHAPE MEMORY POLYMER COMPOSITE MATERIAL AND PREPARATION METHOD THEREOF

CROSS-REFERENCE TO RELATED APPLICATION

The present application is based on, and claims priority from, Chinese application number 201410234045.5, filed May 29, 2014, the disclosure of which is hereby incorporated by reference herein in its entirety.

TECHNICAL FIELD

The present invention relates to smart materials and more particularly to a polymer composite material with two-way shape memory and the preparation method thereof.

BACKGROUND

Smart material (also known as intelligent material system) is a type of new executable functional material that can perceive external stimulus, and take some response and action based on the judgment. Smart material is the fourth generation of material following the natural material, synthetic polymeric material, and artificial design material, nowadays new smart material is one of the most important directions of the development of new high-tech materials. Among others, the shape memory material is the most widely studied smart material, as it has some unique properties such as shape memory effect, pseudo-elasticity, and high damping, meanwhile it can recover its original shape or technical parameters by performing action and having some predetermined response to thermal, mechanical, magnetic, or electrical stimulation. These characteristics of the shape memory material have great scientific significance and important engineering significance, so this kind of material has received tremendous attention in the research of new material.

Nowadays the most intensively investigated shape memory material mainly includes shape memory alloy, shape memory ceramics and shape memory polymer. These materials have the advantages of large deformation, having abundant raw materials, great variety of types, wide range of shape memory recovery temperature, light weight, and easy to synthesize, process, use, transport and package. It has been found that many shape memory alloys such as InTi, TiNi, CuAl, CuAlNi, FeNi, FeMn, FeMnC, $Fe_3Pt$, FeMnSi have the effect of two-way shape memory; however, this effect may be achieved by training these alloys in a special way, and the training result may be affected by such factors as the number of training, training temperature, training period, imposed strain force, whether or not treated with thermal cycling and the like, accordingly, the application of two-way shape memory alloy is greatly restricted. Compared with shape memory alloy, the shape memory polymer has the property of shape memory effect and super elasticity effect, so the two way shape memory polymer is often used to achieve the two way shape memory effect. Currently there are mainly three types of two-way shape memory polymer: 1. liquid crystalline elastomers (LCEs); 2. shape memory polymer under constant tensile; 3. shape memory material-elastomer bonded structure. These three types of polymer have their own advantages and disadvantages respectively, for example, the liquid crystalline elastomers type has a high transition temperature and a high cost, and the synthesis procedure is relatively complicated; the second type may lose the effect of two-way shape memory without the external force; the third type can only realize reversible flexural deformation but cannot realize reversible shrinkage. To our best knowledge, so far none of above mentioned methods could realize bidirectional elongation and reversible shrinkage without external tensile at ambient temperature.

SUMMARY

The purpose of the present invention is to overcome the deficiencies of the prior art, and to provide a polymer composite material having two-way shape memory function without being driven by external stress at room temperature and the preparation method thereof.

To achieve the above object, the present invention provides the following technical solution:

A polymer composite material with two-way shape memory comprising two interpenetrating polymer networks wherein a first polymer network is made of crystalline cross-linked polymer as a shape memory polymer, and a second polymer network is made of a cross-linked elastomeric material.

The two-way shape memory polymer composite material in accordance with the present invention is made based on the property and the structural principle of the interpenetrated network polymer materials. The memory polymer composite material is formed by interpenetration of two polymer networks, wherein the first polymer network, as a shape memory shrinkage segment, will shrink under heating, and the second polymer network acts as the segment for storage of energy. When the first polymer network is heated, it will shrink and press the second polymer network, while the heating is cancelled, the pressed second polymer network will provide a restore force to the first polymer network to recover this polymer network to original shape, therefore the interpenetrated network polymer composite material has the effect of two-way shape memory.

Aiming at overcoming the above-said deficiency, the present invention further provides a method for producing a polymer composite material with two-way shape memory, which comprises the following steps:

obtaining a polymer containing crystalline polymer segment;

obtaining an elastomeric polymer material;

blending the polymer containing crystalline polymer segment and the elastomeric polymer material to obtain a mixture, and cross-linking the crystalline polymer segment of the polymer in the mixture by means of a first stimulation;

stretching the obtained mixture and fixing it, then cross-linking the elastomeric polymer material by means of a second stimulation to obtain a two-way shape memory polymer composite material;

wherein the types of the first stimulation and the second stimulation are different from each other, or the first stimulation and the second stimulation have the same type but with different intensity.

The method for manufacture of polymer composite material with two-way shape memory according to the present invention is a simple technique to produce a material with two-way shape memory at room temperature, this method is easy to perform, and the product has a lower cost and easy to use.

BRIEF DESCRIPTION OF THE DRAWINGS

The present application will be described in detail in the following description with reference to the accompanying drawings and specific examples, of which.

DETAILED DESCRIPTION OF THE INVENTION

Figure 1:
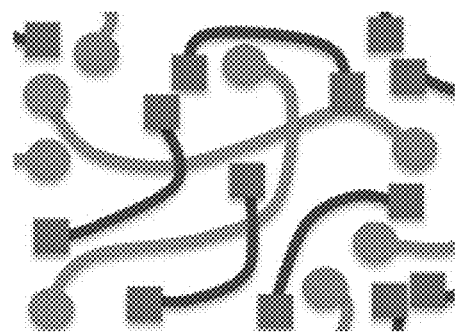
FIG. 1 shows the molecular structure in the mixture prepared by the manufacture method of two-way shape memory polymer material according to one embodiment of the present invention.

Objects, advantages and embodiments of the present application will be explained below in detail with reference to the accompanying drawings and examples. However it should be appreciated that the following description of the example is merely exemplary in nature and is not intended to limit this application.

A polymer composite material with two-way shape memory comprising two interpenetrating polymer networks is provided, wherein a first shape memory polymer network is made of crystalline cross-linked polymer as a shape memory polymer and a second polymer network is made of a cross-linked elastomeric material.

According to one embodiment of the present invention, the crystalline cross-linked polymer may be one or more selected from the group consisting of polyurethane, polyethylene, polynorbonene, trans-polyisoprene and styrene-butadiene copolymer.

The hardness and/or modulus of the cross-linked elastomeric material are/is between that of rubber and plastics, which characteristic ensures that this material may automatically recover from stretching and extension deformation, so as to achieve the desired memory function. For this purpose, the cross-linked elastomeric material may be one or more selected from the group consisting of polyurethane elastomer resin, SBS resin (styrene-butadiene-styrene triblock copolymer), propylene-butene copolymer, hard rubber and silicon rubber, so as to ensure the deformation of the elastomeric material.

Alternatively, there may be additive(s) added into the above obtained mixture, such as dimethoxybenzoin, and PPG diamine.

In accordance with the present invention, the shape memory polymer of crystalline cross-linked polymer and cross-linked elastomeric material are interpenetrated with each other to obtain a polymer composite material of network structure. When the temperature of this composite material rises, the elastic restoring force of the elastomeric material will decrease, while the shape memory polymer will have stronger restoring force when the deformation occurs at a temperature above the shape recovery temperature, therefore the composite material will shrink as the restoring force of the shape memory polymer is larger than the elastic force of the elastomeric material. As the deformation of the elastomeric material increases meanwhile the restoring elastic force thereof grows up until the balance of the forces of these two types of polymer, at that time and the shape of the composite material remains unchanged. When the temperature decreases the restoring elastic force of the elastomeric material will increase meanwhile the restoring force of the shape memory polymer decreases, as a result the increasing elastic force drive the soft segment of the shape memory polymer to re-crystalline in the reverse direction meanwhile the length increases to recover the original state. The two materials independently play their roles and the above cycle continues. Therefore the polymer composite material obtained by interpenetrating and cross linking a shape memory polymer material with secondary deformation with an elastomeric material has the effect of two-way shape memory, large two-way shape recovery ratio, good shape stability. Meanwhile the deformation temperature of the obtained polymer composite material can be adjusted over a wide temperature range, including room temperature, body temperature and other circumstances, and this material always has two-way shape-memory behavior in the above situations.

In the two-way shape memory polymer composite material according to the present invention, the polymer material containing the crystalline polymer segment can maintain the original shape under a lower temperature ($T_1$), it will deform when heated to a higher temperature than the transition temperature ($T_t$), and keep the deformed shape unchanged over a higher temperature ($T_2$) range. Further, when the polymer material containing crystalline polymer segment is cooled from a higher temperature ($T_2$) to a lower temperature ($T_1$) under ambient temperature, it can recover the original shape at lower temperature without external force. According to the present invention, the above transition temperature is the crystalline melting temperature of the crystalline polymer, and the lower temperature ($T_1$) is a temperature lower than transition temperature ($T_t$), and the higher temperature ($T_2$) is a temperature higher than transition temperature ($T_t$). During the use of the material of the present invention, the shape memory effect thereof can be achieved by the change of the external stimulus condition, and the transition condition depends on the melting temperature of the crystalline polymer in the polymer material or other restoring conditions. Therefore, this material makes use of the ability of recovery to original shape with the change of the temperature of the shape memory polymer and the elastic recovery of the deformed elastomeric material and the deformation with the change of temperature has been achieved; that is, the polymer material has an active deformation when the temperature increases, and it will recover the original shape when temperature decreases, thus it has two-way memory behavior with multiple cycle memory for two shape states.

The two-way shape memory polymer according to the present invention is made based on the characteristic and the structural principle of the interpenetrating network polymer composite material. The memory polymer material is formed by interpenetration of two polymer networks, wherein the first polymer network, as a shape memory shrinkage segment, will shrink under heating, and the second polymer network acts as the segment for storage of energy. The first polymer network shrinks and presses the second polymer network under heating, while the heating is cancelled the pressed second polymer network will provide a restoring force to the first polymer network to recover the original shape, therefore the interpenetrating network polymer composite material has the behavior of two-way shape memory.

The present invention further provides a method for producing the above said polymer composite material with two-way shape memory, which comprises:

S10, obtaining a polymer containing crystalline polymer segment as raw material;

S20, obtaining an elastomeric material polymer as another raw material;

S30, blending the polymer containing crystalline polymer segment and the elastomeric material polymer to give a mixed materials, and the obtained mixed materials being treated in a first stimulation mode to cross-link the crystalline polymer in the mixed material, so as to obtain the first cross-linked polymer;

S40, stretching the first cross-linked polymer and fixing it, treating it in a second stimulation mode to cross-link the elastomeric material polymer, so as to obtain the two-way shape memory polymer composite material according to the present invention.

The purpose of the above steps S30 and S40 is to make the two network polymer raw materials sequentially cross-linked to form an interpenetrating structure, therefore the first stimulation mode should be different from the second stimulation mode, alternatively, these two steps employ the same stimulation mode but with different intensity, or else, these two types of network polymer may cross-link and deform with each other simultaneously, and the structure of interpenetration and the function of two-way shape memory cannot be obtained.

According to the production method of the present invention, the polymer containing crystalline polymer segment and the elastomeric material polymer are preferably blended in a solvent to give a mixed materials in the above step S30, wherein the solvent may be dimethylformamide.

Preferably, the ratio of the polymer containing crystalline polymer segment to the elastomeric material polymer is in the range of from 0.2:1 to 10:1.

According to the present invention, the polymer containing crystalline polymer segment has such property that it can be physically or chemically or super molecular cross-linked under UV or non-thermal stimulation, and the cross-linked crystalline polymer may deform under the stimulation of heat, light, electricity, magnetism, humidity and variant pH values, so as to produce a restoring force. According to the present invention, based on the property of the raw material, UV lighting is preferably selected as the first stimulation mode to promote the crosslinking of the crystalline polymer segment in the manufacture process. Then heat stimulus is selected to be used as the second stimulation mode, and in this process the elastomeric material polymer is cross-linked meanwhile the cross-linked crystalline polymer may have deformation so as to achieve a better memory effect.

Of course, the above said stimulation modes are preferred modes based on the preferred characteristics of the raw materials, and in the actual performance the first stimulus and the second stimulus may be different from the above modes, as long as the above purpose can be achieved, these other modes will not be described herein.

In the step S10, the crystalline polymer segment contained in the polymer raw material may be selected from the group consisting of polyester, polyether and polyolefin.

Methods of making polymer containing crystalline polymer segment are disclosed, for example, in CN publication No. 1706998A, which is incorporated herein by reference.

The inner structural change of the raw materials in the above preparation process is shown in FIGS. 1-4. FIG. 1 is a molecular structure diagram showing the molecular arrangement of the two polymers in the mixed materials obtained by blending the two raw materials. After the mixing of the polymer containing crystalline polymer segment (indicated by circle block) and the elastomeric material polymer (indicated by square block), the molecules in the composite materials have an irregular crossed arrangement.

Figure 2:
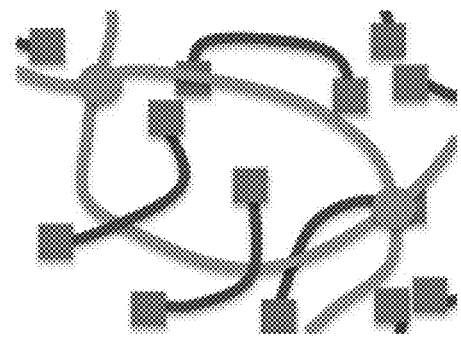
FIG. 2 shows the molecular structure of the cross-linked polymer in the mixture after the first stimulation.

Then, a first cross-linked polymer is obtained by cross-linking the crystalline polymer in the mixed materials in the first stimulus process of the step S30, the molecular structure is shown in FIG. 2, wherein the polymer containing crystalline polymer segment (indicated by circle block) forms a first crosslinked network polymer structure, and the elastomeric material polymer (indicated by square block) interpenetrates regularly or irregularly with the first crosslinked network polymer structure formed by the polymer containing crystalline polymer segment.

Figure 3:
FIG. 3 shows the molecular structure of the cross-linked polymer after stretched.
Figure 4:
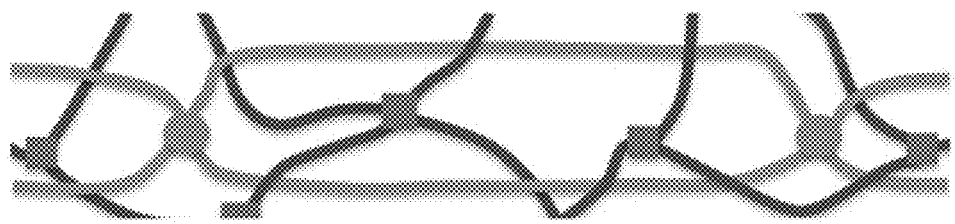
FIG. 4 shows the molecular structure of the interpenetrated network of the two-way shape memory polymer composite material obtained by the second stimulation to the mixture.

Referring to FIG. 3, after the stretching process, the shape of this material becomes slender. Referring to FIG. 4, after the second stimulus process, the structure continues to change, the elastomeric material polymer (indicated by square block) is crosslinked to form a second crosslinked network polymer structure, meanwhile the second crosslinked network polymer structure and the first crosslinked network polymer structure interpenetrate each other to obtain an interpenetrating network structure. In the interpenetrating network structure, the irregular interpenetration accounts for a large proportion, and this structure of interpenetration is caused by irregular molecule movement in the shaping process.

When the two-way shape memory polymer material is prepared by the above process, the memory ability of the product is related with the factors such as the ratio between the raw materials, elongation degree, and hardness of the elastomeric polymer, therefore the memory ability of the product may be adjusted by changing the above factors.

The polymer composite material with two-way shape memory obtained by the process including the above steps may be formed to have a shape of membrane, foam, fiber, and block, furthermore, the appropriate processing can be selected according to occasion demands, so as to achieve a lightweight product and make the product easy to process.

According to the present method for manufacture of polymer material with two-way shape memory, it provides a simple technique to obtain a product with two-way shape memory at room temperature, and the obtained product has a lower cost, and it is easy to operate and use. The method for manufacture the above composite material will be illustrated with reference to the following Examples.

Example 1

The Raw Materials:

Polycaprolactone as a crystalline cross-linked polymer, laboratory-made; the main index of this polymer is: it is capped with carbon-carbon double bond, and the melting temperature thereof is from 35 to 40° C.;

Polytetrahydrofuran as a cross-linked elastomeric material, laboratory-made:

the main index of this polymer is: it is capped with epoxy group, and its molecular weight is in the range of from 750 to 1250;

Dimethoxybenzoin, obtained from Sigma-Aldrich, Inc.;

PPG diamine (brand name D230), Commercial product; the main index of this polymer is, its molecular weight is about 230.

Preparation Process:

S10. the polycaprolactone, polytetrahydrofuran, dimethoxybenzoin, PPG diamine of required amounts (wherein the ratio by weight of polycaprolactone to polytetrahydrofuran was 0.5:1) were mixed and dissolved in dimethylformamide to obtain a mixture, then the mixture was poured into a rectangular mold;

S20. the mixture in the mold was irradiated with a UV lamp for 2 hours to give a gel;

S30. the obtained gel was elongated and fixed to a certain place, then it was heated to 80° C. in an oven and kept at that temperature over 10 hours for crosslinking to give an interpenetrating network polymer composite.

The obtained polymer composite has the following main performance index: the transition temperature is 35 to 45° C.; this polymer will shrink when the temperature rises above the transition temperature, and the polymer will elongate when the temperature drops below the transition temperature.

Example 2

The Raw Materials:

Shape memory polyurethane, laboratory-made (the preparation method please refer to CN publication No. 1706998A); it has the following main index: the hard segment is made of 4,4'-diphenylmethane diisocyanate/1,4-butanediol and it has a melting temperature of from 180 to 200° C., and the soft segment is made of polycaprolactone and it has a melting temperature of from 35 to 40° C.;

Polyurethane elastomer, laboratory-made; it has the following main index: the hard segment is made of hexamethylene diisocyanate/1,4-butanediol and it has a melting temperature of from 130 to 150° C., the soft segment is made of polytetrahydrofuran and it has a glass transition temperature of from −20 to −50° C.;

Preparation Process:

S10. the above two polyurethanes of required amounts (wherein the ratio by weight of shape memory polyurethane to polyurethane elastomer was 8:1) as raw materials were dissolved in dimethylformamide, then the obtained mixture was poured into a mold to form a film at 80° C.;

S20. the obtained film was elongated to two times longer in length and it was fixed to a certain place, then it was heated to 140° C. in an oven and kept at that temperature for 1 minute;

S30. the film was then transferred to an oven of 70° C. and kept at that temperature for 10 minutes, finally this film was taken out and cooled to room temperature to obtain a cross-linked interpenetrating network polymer composite.

In this Example, the first stimulation (i.e. heating) is in the same way as the second stimulation, but the temperature is different in these two stimulations. The obtained shape memory polymer composite has the following main performance index: the transition temperature is from 35 to 45° C.; this polymer will shrink when the temperature is above the transition temperature and the polymer will elongate when the temperature drops below the transition temperature.

The shape memory polymer composite made in the above process has the following advantages: it has two-way shape memory function, good bi-directional reversion ratio, and good stability; there are various raw materials can be selected to prepare this polymer, this polymer has a wide range of shape memory temperature; it has a lower cost and light weight, it is easy to produce, package and transportation; this polymer composite has a simple preparation process that has lower energy consumption is easy to perform, this polymer composite can be employed to make different shapes of complex structures; the composite has property of corrosion resistance, electrical insulation property and good heat preservation. The product has a wide range of potential applications in the fields of textile material, building material, machinery manufacturing, electronic communication, printing and packaging materials, health care, daily necessities, recreation and sports appliance.

The embodiments above are merely the preferable embodiments of the present application and not intended to limit the present application. And all changes equivalent substitution and improvements which come within the meaning and range of equivalency of the present application are intended to be embraced therein.

We claim:

1. A polymer composite material with two-way shape memory, comprising:
   a first polymer network formed of a crystalline cross-linked polymer as a shape memory polymer, and
   a second polymer network formed of a cross-linked elastomeric material;
   wherein the first polymer network and the second polymer network interpenetrate with each other to form an interpenetrating structure, and wherein the first polymer network and the second polymer network within the interpenetrating structure have been cross-linked independently of each other;
   wherein the first polymer network acts as a shape memory shrinkage segment which is capable of shrinking from an original state upon heating to a first temperature higher than a transition temperature and reverting to the original state when the temperature is cooled to a second temperature lower than the transition temperature, and the second polymer network acts as an energy storage segment.

2. The polymer composite material of claim 1, wherein the hardness and/or modulus of the cross-linked elastomeric material are/is between that of rubber and plastics.

3. The polymer composite material of claim 2, wherein the cross-linked elastomeric material is one or more selected from the group consisting of polyurethane elastomer resin, SBS resin, propylene-butene copolymer, hard rubber.

4. The polymer composite material of claim 1, wherein a raw material of the first polymer network is a polymer containing crystalline polymer segment, and a raw material of the second polymer network is an elastomeric polymer material.

5. The polymer composite material of claim 4, wherein the crystalline polymer segment is polyester, polyether or polyolefin.

6. The polymer composite material of claim 4, wherein the polymer containing crystalline polymer segment and the elastomeric polymer material are respectively crosslinked to form the first polymer network and the second polymer network.

7. The polymer composite material of claim 1, wherein the crystalline cross-linked polymer is one or more selected from the group consisting of polyurethane, polyethylene, and polynorbonene.

8. A method for preparing the polymer composite material of claim 1, wherein the method comprises:
   obtaining a polymer containing crystalline polymer segment;
   obtaining a elastomeric material polymer;
   blending the polymer containing crystalline polymer segment and the elastomeric material polymer to obtain a mixture, and cross-linking the polymer of the crystalline polymer segment in the mixture by means of a first stimulation;
   stretching the obtained mixture and fixing it, then cross-linking the elastomeric material polymer by means of a second stimulation to obtain the two-way shape memory polymer composite material, wherein the first stimulation and the second stimulation are different with each other or the first stimulation and the second stimulation have the same type but with different intensity.

9. The method of claim 8, wherein the crystalline polymer segment is polyester, polyether or polyolefin.

10. The method of claim 8, wherein the first stimulation is UV stimulation, and the second stimulation is thermal stimulation.

11. The method of claim 8, wherein the method further comprises: after the two-way shape memory polymer composite material is produced, shaping the two-way shape memory polymer composite material to a membrane, form, fiber, or block.

* * * * *